(12) United States Patent
Kakishima et al.

(10) Patent No.: US 10,064,102 B2
(45) Date of Patent: Aug. 28, 2018

(54) USER TERMINAL, RADIO BASE STATION AND RADIO COMMUNICATION METHOD

(71) Applicant: NTT DOCOMO, INC., Tokyo (JP)

(72) Inventors: Yuichi Kakishima, Tokyo (JP); Kazuki Takeda, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/329,602

(22) PCT Filed: Jul. 29, 2015

(86) PCT No.: PCT/JP2015/071527
§ 371 (c)(1),
(2) Date: Jan. 27, 2017

(87) PCT Pub. No.: WO2016/017705
PCT Pub. Date: Feb. 4, 2016

(65) Prior Publication Data
US 2017/0215107 A1 Jul. 27, 2017

(30) Foreign Application Priority Data
Jul. 30, 2014 (JP) ................................ 2014-155153

(51) Int. Cl.
*H04W 28/18* (2009.01)
*H04W 88/06* (2009.01)
(Continued)

(52) U.S. Cl.
CPC .......... *H04W 28/18* (2013.01); *H04W 28/08* (2013.01); *H04W 36/30* (2013.01);
(Continued)

(58) Field of Classification Search
CPC ... H04W 28/18; H04W 36/30; H04W 72/042; H04W 28/08; H04W 52/0216; H04W 88/06
See application file for complete search history.

(56) References Cited

U.S. PATENT DOCUMENTS

2013/0272230 A1* 10/2013 Dinan ............... H04W 52/18
370/329
2017/0238262 A1* 8/2017 Park .................. H04W 52/146
455/522

OTHER PUBLICATIONS

Office Action issued in the counterpart Japanese Patent Application No. 2014-155153, dated Sep. 29, 2015 (9 pages).
(Continued)

*Primary Examiner* — Gbemileke J Onamuti
(74) *Attorney, Agent, or Firm* — Jonathan P. Osha

(57) ABSTRACT

The present invention is designed so that, even when a user terminal connects with a plurality of radio base stations by employing dual connectivity (DC), the deterioration of uplink communication quality can be reduced. A user terminal communicates with a first radio base station that configures a first cell group and a second radio base station that configures a second cell group, by using dual connectivity, and has a transmission section that transmits an UL signal and/or a UL channel that includes an SRS to each cell group, and a control section that controls the transmission power of the UL signal and/or the UL channel for each cell group, and the control section controls the transmission power of the UL signal and/or the UL channel for each cell group based on the guaranteed power that is configured in at least one of the cell groups.

6 Claims, 13 Drawing Sheets

(51) Int. Cl.
   *H04W 36/30* (2009.01)
   *H04W 72/04* (2009.01)
   *H04W 28/08* (2009.01)
   *H04W 52/02* (2009.01)

(52) U.S. Cl.
   CPC ..... *H04W 52/0216* (2013.01); *H04W 72/042* (2013.01); *H04W 88/06* (2013.01)

(56) References Cited

OTHER PUBLICATIONS

International Search Report issued in PCT/JP2015/071527 dated Oct. 6, 2015 (2 pages).
Written Opinion of the International Searching Authority issued in PCT/JP2015/071527 dated Oct. 6, 2015 (5 pages).
3GPP TS 36.300 V8.5.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; May 2008 (134 pages).
3GPP TSG-RAN WG1 Meeting #77; R1-142264; NTT DOCOMO; "Power-control mechanisms for dual connectivity"; Seoul, Korea; May 19-23, 2014 (8 pages).
3GPP TSG-RAN WG1 Meeting #76bis; R1-141899; NTT DOCOMO; "Outcome of the email discussion [76b-08] on TPC aspects of Dual Connectivity"; Shenzhen, China; Mar. 31-Apr. 4, 2014 (30 pages).
3GPP TSG-RAN WG1 Meeting #77; R1-142347; InterDigital; "Power sharing in dual connectivity"; Seoul, Korea; May 19-23, 2014 (5 pages).
Extended European Search Report issued in the counterpart European Patent Application No. 15827575.0, dated Dec. 21, 2017 (9 pages).
LG Electronics; "Summary of email discussion [77-11]: Details of priority rule based on UCI types across CGs for dual connectivity power control"; 3GPP TSG RAN WG1 Meeting #77, R1-142776; Seoul, Korea, May 19-23, 2014 (13 pages).

* cited by examiner

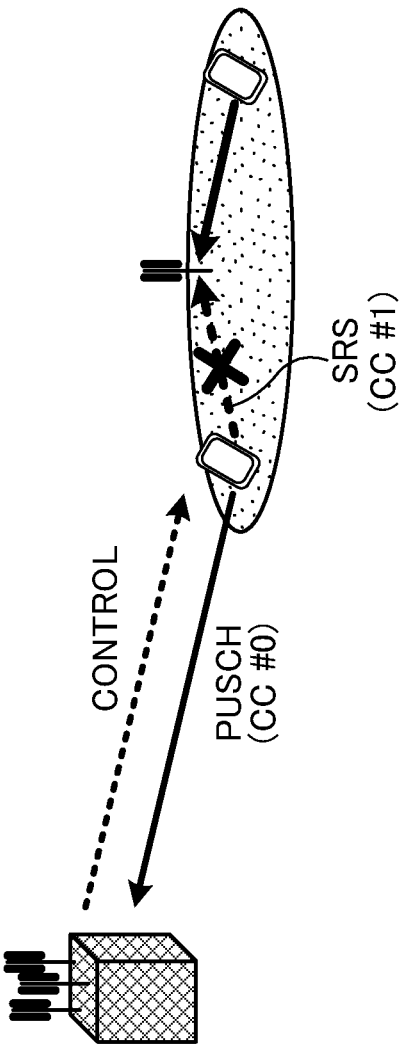
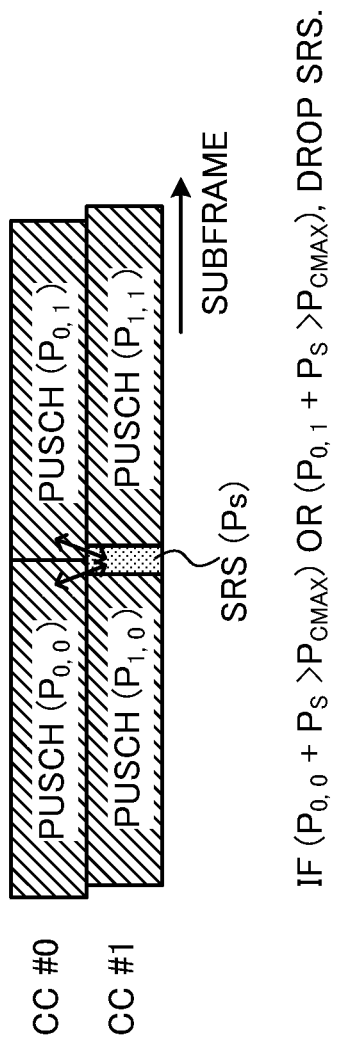
FIG.2A
FIG.2B

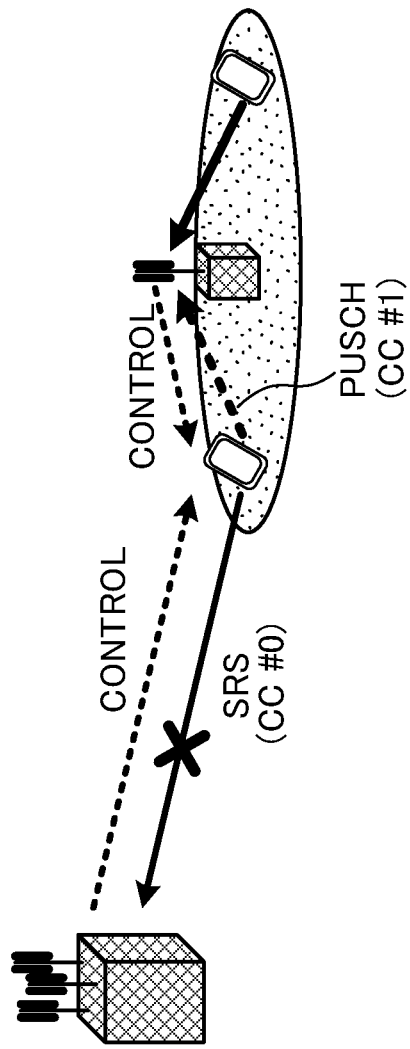
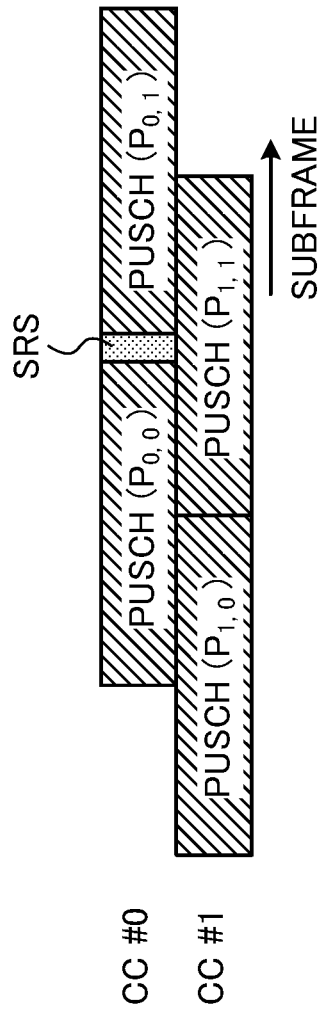
FIG.3A
FIG.3B

| VALUE OF SRS REQUEST FIELD | DESCRIPTION |
|---|---|
| '00' | NO TYPE 1 SRS TRIGGER |
| '01' | THE 1ST SRS PARAMETER SET CONFIGURED BY HIGHER LAYERS |
| '10' | THE 2ND SRS PARAMETER SET CONFIGURED BY HIGHER LAYERS |
| '11' | THE 3RD SRS PARAMETER SET CONFIGURED BY HIGHER LAYERS |

FIG.7A

| VALUE OF SRS REQUEST FIELD | DESCRIPTION |
|---|---|
| '00' | NO TYPE 1 SRS TRIGGER |
| '01' | THE 1ST SRS PARAMETER SET AND PRIORITY CONFIGURED BY HIGHER LAYERS |
| '10' | THE 2ND SRS PARAMETER SET AND PRIORITY CONFIGURED BY HIGHER LAYERS |
| '11' | THE 3RD SRS PARAMETER SET AND PRIORITY CONFIGURED BY HIGHER LAYERS |

FIG.7B

USER TERMINAL, RADIO BASE STATION AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1).

In LTE, as multiple-access schemes, a scheme that is based on OFDMA (Orthogonal Frequency Division Multiple Access) is used in downlink channels (downlink), and a scheme that is based on SC-FDMA (Single Carrier Frequency Division Multiple Access) is used in uplink channels (uplink).

A successor system of LTE—referred to as "LTE-advanced" (also referred to as "LTE-A")—has been under study for the purpose of achieving further broadbandization and increased speed beyond LTE, and the specifications thereof have been drafted as LTE Rel. 10/11. Also, the system band of LTE Rel. 10/11 includes at least one component carrier (CC), where the LTE system band constitutes one unit. Such bundling of a plurality of CCs into a wide band is referred to as "carrier aggregation" (CA).

In LTE Rel. 12, which is a more advanced successor system of LTE, various scenarios to use a plurality of cells in different frequency bands (carriers) are under study. When the radio base stations to form a plurality of cells are substantially the same, the above-described CA is applicable. On the other hand, a study in progress to employ dual connectivity (DC) when the cells are formed by completely different radio base stations.

CITATION LIST

Non-Patent Literature

Non-Patent Literature 1: 3GPP TS 36. 300 "Evolved Universal Terrestrial Radio Access (E-UTRA) and Evolved Universal Terrestrial Radio Access Network (E-UTRAN); Overall Description; Stage 2"

SUMMARY OF INVENTION

Technical Problem

In LTE/LTE-A, an uplink data signal (PUSCH signal), an uplink control signal (PUCCH signal), a sounding reference signal (SRS) and so on are stipulated as signals to be transmitted on the uplink (UL signals). The SRS is a reference signal that is used for channel quality measurements and so on, and a radio base station can learn channel states based on the SRS that is transmitted from a user terminal periodically or aperiodically.

As noted earlier, when a plurality of cells are formed by a single radio base station in effect (for example, when CA is employed), this radio base station can control the scheduling of UL signals and/or the uplink transmission power by considering, in a comprehensive manner, the uplink transmission power of a user terminal in each cell.

However, when a plurality of radio base stations each connect with a user terminal as in dual connectivity (DC), every radio base station might control the scheduling of the user terminal (for example, time/frequency resource allocation) and the uplink transmission power independently. In this case, it is difficult for each radio base station to know what resource allocation the other radio base stations are conducting. As a result of this, there is a threat that the uplink transmission power in the user terminal cannot be controlled adequately.

For example, when, based on commands (UL grants) from each radio base station, a user terminal that employs dual connectivity transmits a UL signal with requested transmission power, cases might occur where the UL transmission power exceeds the maximum transmission power that is allowed to the user terminal. In this case, how to control the uplink transmission power is the problem.

For example, it may be possible to transmit the PUSCH signal, the PUCCH signal and so on, with priority over the SRS (that is, drop the SRS), as when CA is employed in existing systems (for example, Rel. 11). However, as mentioned earlier, in dual connectivity, each radio base station controls scheduling on its own. Consequently, even in DC, if a control method for existing systems is applied on an as-is basis, this might reduce the opportunities to transmit SRSs from a user terminal significantly, and lead to a deterioration of uplink communication quality. Alternatively, it is necessary to keep the transmission power low in order to avoid power control such as dropping and power scaling.

The present invention has been made in view of the above, and it is therefore an object of the present invention to provide a user terminal, a radio base station and a radio communication method, whereby, even when a user terminal connects with a plurality of radio base stations by employing dual connectivity (DC), it is possible to reduce the deterioration of uplink communication quality.

Solution to Problem

One aspect of the present invention provides a user terminal that communicates with a first radio base station that configures a first cell group and a second radio base station that configures a second cell group, by using dual connectivity, and this user terminal has a transmission section that transmits an UL signal and/or a UL channel that includes an SRS to each cell group, and a control section that controls the transmission power of the UL signal and/or the UL channel for each cell group, and the control section controls the transmission power of the UL signal and/or the UL channel for each cell group based on the guaranteed power that is configured in at least one of the cell groups.

Advantageous Effects of Invention

According to the present invention, even when a user terminal connects with a plurality of radio base stations by employing dual connectivity (DC), it is possible to reduce the deterioration of uplink communication quality.

BRIEF DESCRIPTION OF DRAWINGS

FIG. 2 provide diagrams to explain SRS transmission control in carrier aggregation;

FIG. 3 provide diagrams to explain SRS transmission control in dual connectivity;

FIG. 7 provide diagrams to show tables in which whether or not an aperiodic SRS is triggered and SRS parameters are configured;

DESCRIPTION OF EMBODIMENTS

FIG. 1 provide diagrams to show examples of cell structures in carrier aggregation (CA) and dual connectivity (DC). In FIG. 1, the UE is connected with five cells (C1 to C5). C1 is the PCell (Primary Cell), and C2 to C5 are SCells (Secondary Cells).

Figure 1A:
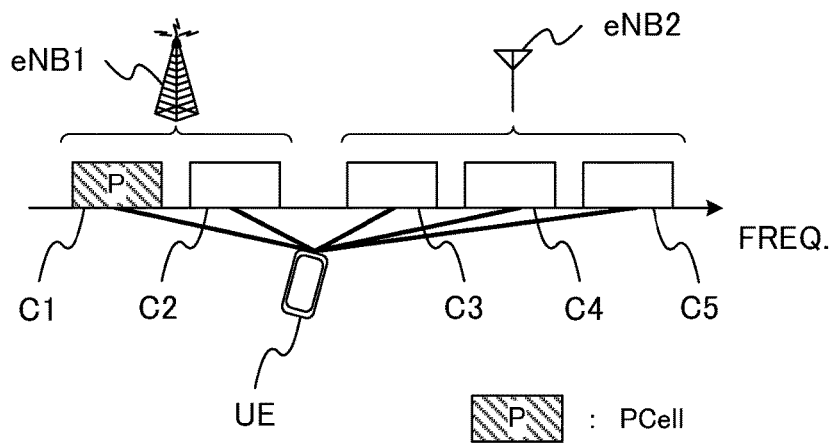
FIG. 1 provide diagrams to show communication between radio base stations and a user terminal in carrier aggregation and dual connectivity.

FIG. 1A shows communication between radio base stations and a user terminal that are engaged in carrier aggregation (CA). CA is a technique to bundle a plurality of frequency blocks (also referred to as "component carriers" (CCs), "cells," etc.) into a wide band. Each CC has, for example, a maximum 20 MHz bandwidth, so that, when maximum five CCs are bundled, a wide band of maximum 100 MHz is provided.

In the example shown in FIG. 1A, the radio base station eNB1 is a radio base station to form a macro cell (hereinafter referred to as a "macro base station"), and the radio base station eNB2 is a radio base station to form a small cell (hereinafter referred to as a "small base station"). For example, the small base station may be structured like an RRH (Remote Radio Head) that connects with the macro base station. Based on this, CA may be referred to as "intra-base station CA" (intra-eNB CA).

When carrier aggregation is employed, one scheduler (for example, the scheduler provided in macro base station eNB1) controls the scheduling of multiple cells. In the structure in which the scheduler provided in macro base station eNB1 controls the scheduling of multiple cells, each radio base station may be connected by using, for example, an ideal backhaul that provides a high speed channel, such as optical fiber. Also, CA provides support for timing advance groups (TAGs), which are classified based on transmission timings, and the maximum transmission timing gap between varying TAGs is 32.47 μs.

Figure 1B:
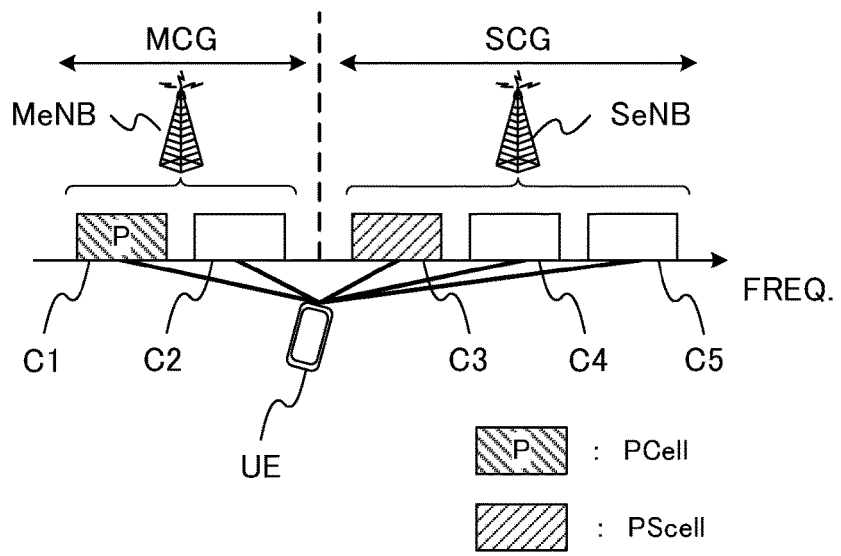

FIG. 1B shows communication between radio base stations and a user terminal that are engaged in dual connectivity (DC). When dual connectivity is employed, a plurality of schedulers are provided separately, and these multiple schedulers (for example, the scheduler provided in the radio base station MeNB and the scheduler provided in the radio base station SeNB) each control the scheduling of one or more cells they have control over. Based on this, DC may be referred to as "inter-base station CA" (inter-eNB CA). Note that, in DC, CA (intra-eNB CA) may be employed per individual scheduler (that is, base station) that is provided.

In the structure in which the scheduler provided in the radio base station MeNB and the scheduler provided in the radio base station SeNB control the scheduling of one or more cells they each have control over, each radio base station may be connected by using, for example, a non-ideal backhaul that produces substantial delays, such as the X2 interface. Also, in DC, the radio base stations are capable of operating completely asynchronously, and, in this case, maximum 500 μs of subframe gaps are produced in communication between different radio base stations.

Referring to FIG. 1B, in dual connectivity, each radio base station configures a cell group (CG) that is comprised of one cell or a plurality of cells. Each cell group is comprised of one or more cells formed by the same radio base station, or one or more cells formed by the same transmission point, which may be a transmitting antenna apparatus, a transmission station and so on.

The cell group that includes the PCell will be hereinafter referred to as the "master cell group" (MCG), and the cell group that is not the master cell group will be hereinafter referred to as the "secondary cell group" (SCG). The total number of cells to constitute the MCG and the SCG is configured to be equal to or less than a predetermined value (for example, five cells).

The radio base station in which the MCG is configured (and which communicates by using the MCG) will be hereinafter referred to as the "master base station" (MeNB: Master eNB), and the radio base station in which the SCG is configured (and which communicates by using the SCG) will be hereinafter referred to as the "secondary base station" (SeNB: Secondary eNB).

Dual connectivity does not presume cooperation between radio base stations that is equivalent to that used in carrier aggregation. Consequently, the user terminal executes downlink L1/L2 control (PDCCH/EPDCCH) and uplink L1/L2 control (UCI (Uplink Control Information) feedback through the PUCCH/PUSCH) independently, on a per cell group basis. Consequently, the SeNB, too, needs a special SCell that has equivalent functions to those of the PCell (for example, the common search space, the PUCCH and so on). A special SCell having equivalent functions to those of the PCell will be also referred to as a "PSCell."

As shown FIG. 1A, when a plurality of cells are formed by the same radio base station in effect (for example, when CA is employed), the radio base station can control the scheduling, the uplink transmission power, and so on, by considering, in a comprehensive manner, the uplink transmission power of a user terminal in each cell. The user terminal can transmit UL signals in a plurality of cells, simultaneously, if not in the power-limited state.

Here, "power-limited" refers to the state in which, at a timing the user terminal attempts transmission, the UL transmission power is already at the maximum transmission power. For example, "power-limited" means that the transmission power of uplink signals is limited because uplink signal transmission to exceed the user terminal's maximum possible transmission power is in request. That is, this means that the total transmission power that is needed to transmit UL signals to a plurality of cells exceeds the user terminal's maximum possible transmission power. The transmission power that is needed (also referred to as the "desired power," the "desired transmission power," and so on) includes the requested power (requested transmission power), which is reported from the radio base stations, and transmission power that is increased by applying power-ramping based on the requested power.

In existing systems (for example, Rel. 11), when a user terminal transmits UL signals and the transmission power that is required for the UL transmission exceeds a predetermined value (for example, $P_{CMAX}$), the user terminal applies transmission control and/or power control to the UL signals according to predetermined rules. The UL signals may include the uplink random access channel (PRACH), the PUCCH signal that is transmitted in the uplink control channel (PUCCH), the PUSCH signal that is transmitted in the uplink shared channel (PUSCH), the SRS and so on.

For example, assume a case where, as shown in FIG. 2A, a user terminal connects with CC #0 (cell #0) and CC #1 (cell #1) by employing CA, and transmits an SRS in CC #1. In this case, before transmitting the SRS in CC #1, the user terminal decides whether or not the total value of the transmission power of this SRS and the transmission power of the UL signal (in this case, the PUSCH signal) which the user terminal transmits in the other CC #0 (also referred to as the "gross transmission power," the "sum of transmission power," and so on) exceeds a predetermined value (see FIG. 2B). As for the predetermined value, the maximum transmission power ($P_{CMAX}$) that is allowed to the user terminal can be used.

When the total value of the transmission power of the SRS (requested power) and the transmission power of the PUSCH signal (requested power) exceeds the predetermined value, the user terminal applies control not to transmit the SRS (also referred to as "drop," "dropping," etc.). That is, the user terminal applies transmission control to prioritize the PUSCH signal over the SRS.

Note that FIG. 2B shows a case where the UL transmission timings in CC #0 and the UL transmission timings in CC #1 are different (the TAGs are different). In this case, the user terminal controls the transmission of the SRS, taking into consideration the transmission power of the PUSCH signal in each of the two subframes of CC #0.

Also, when SRS transmission and PUCCH signal transmission occur at the same time and the total value of the transmission power exceeds a predetermined value, the user terminal transmit the PUCCH signal preferentially over the SRS. Similarly, when SRS transmission and PRACH signal transmission occur at the same time and the total value of the transmission power exceeds a predetermined value, the user terminal transmits the PRACH signal prudentially over the SRS. Note that the PUSCH signal transmission power may read the "PUSCH power," the PUCCH signal transmission power may read the "PUCCH power," and the PRACH signal transmission power may read the "PRACH power."

In this way, in existing systems, the user terminal has to control whether or not to actually transmit an SRS, taking into consideration the total value of the transmission power of the SRS (requested power) and the transmission power of the UL signals which the user terminal transmits in other cells (or CCs) (requested power). By contrast, in CA, a radio base station controls the scheduling for other cells as well, so that comprehensive power control to take SRS transmission into consideration is made possible. Also, if no SRS is transmitted from the user terminal, the radio base station is able to notice the situation. If an SRS needs to be transmitted from the user terminal, the radio base station can dynamically command the user terminal to transmit an SRS (aperiodic SRS).

Meanwhile, the user terminal operation (for example, SRS control) for when the power-limited state is assumed during dual connectivity (DC) is not stipulated yet. So, when DC is employed, it may be possible to control UL signals (for example, SRS transmission) as in existing systems (CA).

For example, assume a case where, as shown in FIG. 3A, the user terminal connects with CC #0 (cell #0) and CC #1 (cell #1) by employing DC and transmits an SRS in CC #0. In this case, before transmitting the SRS in CC #0, the user terminal decides whether or not the total value of the transmission power of this SRS and the transmission power of the UL signal (in this case, the PUSCH signal) which the user terminal transmits in the other CC #1 exceeds a predetermined value (see FIG. 3B).

When the total value of the transmission power of the SRS (requested power) and the transmission power of the PUSCH signal (requested power) exceeds the predetermined value the user terminal applies control not to transmit the SRS (also referred to as "drop," "dropping" and so on) (the same as in existing systems).

However, when a plurality of cells are formed by different radio base stations (when DC is employed), it is difficult for each radio base station to learn about the resource allocation, power control (requested power for UL signals) and so on in the other radio base stations. That is, when DC is employed, every radio base station controls the user terminal's uplink transmission power, modulation scheme and so on independently, and this makes it difficult to adjust the transmission power dynamically within a range in which the user terminal's total transmission power does not exceed the maximum possible transmission power.

Furthermore, when dual connectivity is employed, each radio base station is unable to know what power control its counterpart is using, and there is a fear that the timings and frequency of power scaling and/or dropping in the user terminal cannot be predicted. When the user terminal executes power scaling and/or dropping in a way that is unpredictable to each radio base station (the master base station MeNB and the secondary base station SeNB), uplink communication can no longer be executed properly, which then raises a fear of a significant deterioration of the quality of communication, throughput and so on.

For example, referring to FIG. 3A, since the radio base station to configure CC #0 (for example, MeNB) cannot control the scheduling and transmission power in CC #1, there is a fear that, depending on the situation of communication, the opportunities to transmit SRSs from the user terminal to CC #0 may be reduced. Also, the MeNB has difficulty knowing the reason for not receiving SRSs. In particular, it is important to transmit SRSs in cells (for example, the PCell) that constitute the MCG in radio communication from the perspective of channel state measurements, checking connectability, and so on.

So, the present inventors have come up with the idea of reducing the deterioration of uplink communication quality by adequately controlling the transmission of UL signals (for example, SRSs) in each cell group even when dual connectivity (DC) is employed. To be more specific, assuming the case where dual connectivity (DC) is employed, the present inventors have come up with the idea of (1) configuring guaranteed power (minimum guaranteed power) in SRSs, (2) configuring priority in SRS transmission/transmission power control, (3) applying power scaling, and (4) sending signaling to the radio base stations.

Now, the present embodiment will be described below in detail. Note that although the SRS will be shown as the UL signal in the following description, the UL signals to which the present embodiment can be applied are by no means limited to this.

First Example

A case will be described with a first example where, when dual connectivity (DC) is employed, guaranteed power (also referred to as "minimum guaranteed power," "guaranteed transmission power," and so on) is configured in SRSs.

Guaranteed power refers to the power that is reserved for use by a user terminal as UL signal transmission power. According to the present embodiment, the guaranteed power of an SRS can be configured in at least one cell group (CG). Nevertheless, when the power that is requested from a radio base station is lower than the guaranteed power, the user terminal can transmit the SRS with the requested power. Also, when the power that is requested from the radio base station is greater than the guaranteed power, whether or not the power-limited state is assumed, the requested power configured in other cell groups, and so on are taken into consideration, and the SRS is transmitted by applying power scaling until the requested power or the guaranteed power is reached.

A case will be assumed here where, as an example, the MCG' guaranteed power is $P_{MeNB}$, and the SCG's guaranteed power is $P_{SeNB}$. The master base station MeNB and the secondary base station SeNB report one or both of the guaranteed power $P_{MeNB}$ and $P_{SeNB}$ to the user terminal through higher layer signaling (for example, RRC signaling). When there is no signaling or command in particular, the user terminal may understand that certain guaranteed transmission power is provided. For example, the user terminal may understand that: guaranteed transmission power $P_{MeNB}$=0 and/or $P_{SeNB}$=0, $P_{MeNB}$=$P_{CMAX}$ and/or $P_{SeNB}$=0, and so on.

When the user terminal transmits an SRS to the master base station MeNB—that is, when SRS transmission is triggered by downlink control information and/or RRC signaling—the user terminal calculates the transmission power for the MCG. When the requested power is equal to or lower than the guaranteed transmission power $P_{MeNB}$, the user terminal determines that this requested power is the MCG's transmission power.

Similarly, when the user terminal transmits an SRS to the secondary base station SeNB—that is, when SRS transmission is triggered by downlink control information and/or RRC signaling—the user terminal calculates the transmission power for the SCG. If the requested power is equal to or lower than the guaranteed transmission power $P_{SeNB}$, the user terminal determines that this requested power is the SCG's transmission power.

When the requested power for a radio base station xeNB (either the master base station MeNB or the secondary base station SeNB) exceeds guaranteed transmission power $P_{xeNB}$ (either the guaranteed transmission power $P_{MeNB}$ or $P_{SeNB}$), the user terminal can control the transmission power to be equal to lower than the guaranteed transmission power $P_{xeNB}$, depending on conditions.

Now assume, as an example, a case where the total of the requested power for the MCG and the SCG shows a threat of exceeding the user terminal's maximum possible transmission power $P_{CMAX}$. In this case, the user terminal applies power scaling and/or dropping to part of the channels or signals, with respect to the cell group where the requested power exceeds the guaranteed transmission power $P_{xeNB}$. If, as a result of this, the transmission power equals or falls below the guaranteed transmission power $P_{xeNB}$, the user terminal no longer applies power scaling and/or dropping.

That is, a structure in can be used, which transmission is guaranteed to be given at least the guaranteed transmission power $P_{MeNB}$ or $P_{SeNB}$, for the maximum transmission power of an SRS in dual connectivity. Alternatively, it is also possible to introduce guaranteed power conditionally, depending on the allocation in other cell groups, the specifications of user terminals, and so on. For example, when the power that is requested from the radio base station is equal to or lower than the guaranteed power, the SRS can be transmitted with this requested power, and, when the power that is requested from the radio base station is greater than the guaranteed power, the SRS can be transmitted with transmission power that is at least equal to the guaranteed power or greater.

Figure 4B:
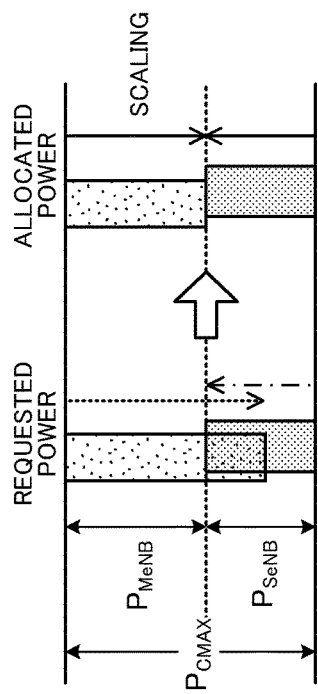
FIG. 4 provide diagrams to explain examples of SRS power control in dual connectivity.
Figure 4A:
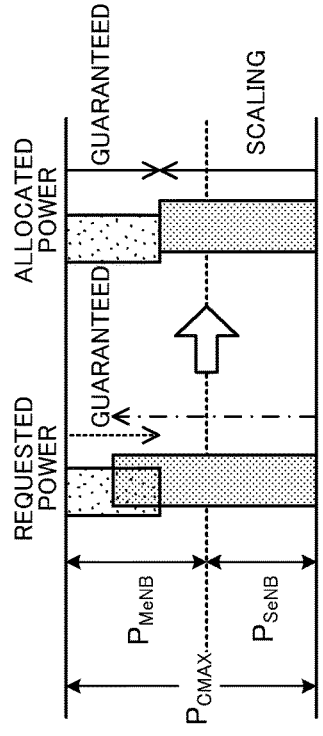

In the example shown in FIG. 4A, power that is equal to or lower than the guaranteed transmission power $P_{MeNB}$ is requested from the master base station MeNB to transmit a UL signal (for example, an SRS) in the MCG, and power to exceed the guaranteed transmission power $P_{SeNB}$ is requested from the secondary base station SeNB to transmit a UL signal (for example, the PUSCH signal) in the SCG. The user terminal checks whether or not the total sum of the transmission power per CC exceeds the guaranteed transmission power $P_{MeNB}$ and $P_{SeNB}$ in both the MCG and the SCG, and whether or not the total sum of the transmission power of all CCs in both cell groups exceeds the maximum possible transmission power $P_{CMAX}$.

In the example shown in FIG. 4A, the total sum of the transmission power of all CCs in both cell groups exceeds the maximum possible transmission power $P_{CMAX}$, so that the user terminal applies power scaling or dropping. While the total sum of the transmission power of each CC in the MCG does not exceed the guaranteed transmission power $P_{MeNB}$, the total sum of the transmission power of each CC in the SCG exceeds the guaranteed transmission power $P_{SeNB}$, so that the user terminal allocates the requested power to the MCG as transmission power, and allocates the rest of the power (the extra power that is left after the MCG's transmission power is subtracted from the maximum possible transmission power $P_{CMAX}$) to the SCG. The user terminal sees this remaining power as the maximum possible transmission power for the SCG, and applies power scaling or dropping to the SCG.

In the example shown in FIG. 4B, power to exceed the guaranteed transmission power $P_{MeNB}$ is requested from the master base station MeNB to transmit a UL signal (for example, an SRS) in the MCG, and power that is equal to lower than the guaranteed transmission power $P_{SeNB}$ is requested from the secondary base station SeNB to transmit a UL signal (for example, the PUSCH signal) in the SCG. The total sum of the transmission power of all CCs in both cell groups exceeds the maximum possible transmission power $P_{CMAX}$, so that the user terminal applies power scaling or dropping.

In the example shown in FIG. 4B, while the total sum of the transmission power of each CC in the SCG does not exceed the guaranteed transmission power $P_{SeNB}$, the total sum of the transmission power of each CC in the MCG exceeds the guaranteed transmission power $P_{MeNB}$, so that the user terminal allocates the requested power to the SCG as transmission power, and allocates the rest of the power (the extra power that is left after the SCG's transmission power is subtracted from the maximum possible transmission power $P_{CMAX}$) to the MCG. The user terminal sees the above remaining power (≥guaranteed power) as the maximum possible transmission power for the MCG, and applies power scaling or dropping to the MCG. As for the rules of power scaling and/or dropping, the rules set forth in Rel. 10/11 can be applied.

Figure 4C:
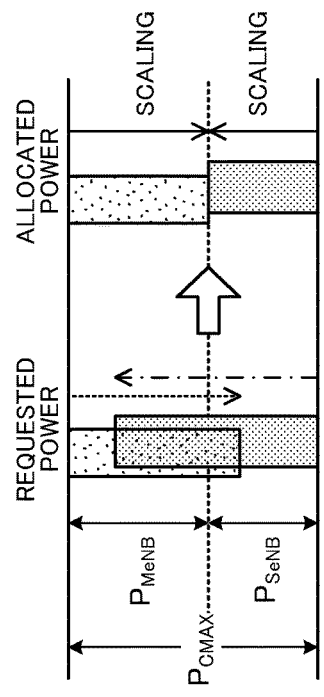

In the example shown in FIG. 4C, power to exceed the guaranteed transmission power $P_{MeNB}$ is requested from the master base station MeNB to transmit a UL signal (for example, an SRS) in the MCG, and power to exceed the guaranteed transmission power $P_{SeNB}$ is requested from the secondary base station SeNB to transmit a UL signal (for example, the PUSCH signal) in the SCG. In this case, the total sum of the transmission power of each CC in the MCG exceeds the guaranteed transmission power $P_{MeNB}$, and the total sum of the transmission power of each CC in the SCG exceeds the guaranteed transmission power $P_{SeNB}$, so that the power of both cell groups is subjected to power scaling, down to the guaranteed power.

Note that, although a case has been shown with the above description where SRS guaranteed power is configured in each cell group, the present embodiment is by no means limited to this. For example, guaranteed power for SRSs may be configured in at least one cell group (for example, the cell group to include the PCell) among a plurality of cells groups. Also, it is equally possible to selectively configure guaranteed power for SRSs in part or all of the cells (CCs) that constitute a cell group.

<Relationship with Guaranteed Power of PUSCH/PUCCH>

Also, in dual connectivity (DC), it might occur that guaranteed power is configured for PUCCH/PUSCH transmission as well. When a transmission request arrives from the master base station MeNB (or from the secondary base station SeNB)—that is, when PUCCH/PUSCH transmission is triggered by an uplink grant or RRC signaling—the user terminal determines the transmission power considering the requested power and the guaranteed power.

According to one aspect of the present embodiment, the user terminal controls the transmission power of an SRS on the assumption that the power that is guaranteed for the SRS is the same as the guaranteed power that is configured for the PUCCH and/or the PUSCH. In this case, information signaling (higher layer signaling) regarding the guaranteed power of the SRS can be included in information signaling regarding the guaranteed power of the PUCCH and/or the PUSCH. By this means, it is possible to reduce the signaling bits that relate to the guaranteed power, and adequately secure the opportunities to transmit SRSs in each cell group.

Alternatively, according to another aspect, the user terminal controls the transmission power of an SRS, taking into consideration the offset of the guaranteed power of the SRS from the guaranteed power of the PUSCH and/or the PUCCH. As for the offset value, a fixed value may be determined and reported implicitly from the radio base stations to the user terminal, or reported explicitly by using higher layer signaling (for example, by using RRC signaling, broadcast signal and so on).

Besides, the offset value can be reported to the user terminal by using an offset value ($P_{SRS\_OFFSET,c}$) that is used for the transmission power of SRSs. In existing systems (for example, Rel. 11), the transmission power of an SRS is given by applying an offset value ($P_{SRS\_OFFSET,c}$) to the PUSCH transmission power, as shown in following equation 1:

[1]

$$P_{SRS,c}(i) = \min\{P_{CMAX,c}(i), P_{SRS\_OFFSET,c}(m) + 10\log_{10}(M_{SRS,c}) + P_{O\_PUSCH,c}(j) + a_c(j) \cdot PL_c + f_c(i)\}$$ (Equation 1)

So, the guaranteed power for the SRS is determined, taking into consideration the guaranteed power for the PUSCH and/or the PUCCH and this offset value ($P_{SRS\_OFFSET,c}$). The guaranteed power of the PUSCH and/or the PUCCH and the offset value ($P_{SRS\_OFFSET,c}$) can be reported to the user terminal in advance by using higher layer signaling and so on.

Figure 5:
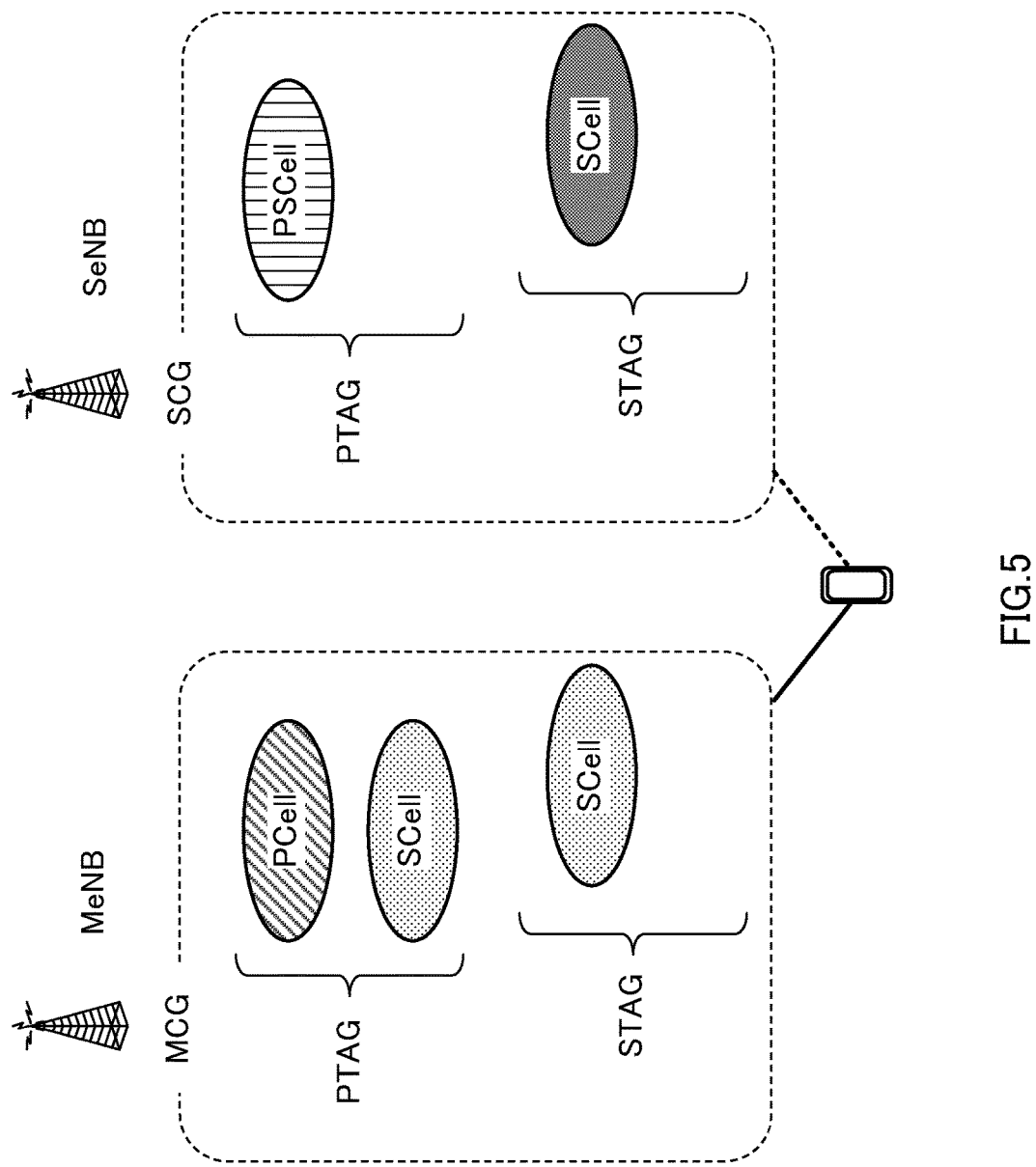
FIG. 5 is a diagram to show the concepts of cell groups, timing advance groups and cells.

Also, the setting of guaranteed power for SRSs can be controlled depending on to which destination UL signals are transmitted. When dual connectivity is employed, the user terminal connects with varying cell groups formed by separate base stations. Furthermore, in each cell group, there are classifications of cells (the PCell (PSCell) and SCells), classifications of timing advance groups (TAGs) (the PTAG and STAGs), and so on (see FIG. 5).

According to the present embodiment, different guaranteed power can be configured for every classification of cell groups (CGs), timing advance groups (TAGs) and/or cells. Alternatively, it is equally possible to configure guaranteed power in part of the cell groups (for example, in the PCG alone). Similarly, it is also possible to configure guaranteed power in part of the TAGs (for example, in the PTAG alone), or configure guaranteed power in part of the cells (for example, in the PCell alone).

For example, it is possible to configure different guaranteed power per PCG and SCG. To be more specific, the guaranteed power for SRSs in the PCG can be configured higher than the guaranteed power for SRSs in SCGs. Alternatively, it is equally possible to configure different guaranteed power for every classification of, or for each of, the PCell and SCells (or the PCell, SCells and PSCells), or configure different guaranteed power for every classification of, or for each of, the timing advance groups (the PTAG and STAGs).

In this way, by configuring guaranteed power for every classification of, or for each of, the cell groups (CGs), timing advance groups (TAG) and/or cells, it is possible to flexibly configure the destination where SRS transmission is maintained. As a result of this, it is possible to reduce the deterioration of communication quality and improve the throughput.

Also, the setting of guaranteed power for SRSs can be controlled based on the classification (type) of SRSs. For example, different guaranteed power can be configured between an SRS that is transmitted periodically (also referred to as a "periodic SRS," "trigger type 0," and so on) and an SRS that is transmitted aperiodically (also referred to as an "aperiodic SRS," "trigger type 1," and so on). Alternatively, it is also possible to configure guaranteed power in one of periodically-transmitted SRSs and aperiodically-transmitted SRSs (for example, in aperiodic SRSs). By configuring guaranteed power for aperiodic SRSs, it becomes possible to properly assure the transmission of SRSs which the radio base station requests to the user terminal.

Also, when configuring guaranteed power with respect to periodic SRSs, the user terminal may control whether or not to apply guaranteed power based on the timings (for example, the subframe numbers) and/or the frequency resources in which the SRSs are transmitted. That is, the user terminal may configure priority subframes for transmitting the SRSs and non-priority subframes, and switch between and control applying and not applying guaranteed power.

Alternatively, the user terminal may configure priority frequency resources for transmitting the SRSs and non-priority frequency resources, and switch between and control applying and not applying guaranteed power. For example, the timings to configure guaranteed power (for example, subframes) may be determined in advance in the specification, or can be reported from the radio base station to the user terminal through higher layer signaling (for example, RRC signaling, a broadcast signal and so on).

In this way, by selectively configuring guaranteed power only in part of the SRSs, the SRSs for which guaranteed power is not configured can be transmitted in non-power-limited situations, and, in power-limited situations, the transmission of the SRSs for which guaranteed power is configured is assured. In this case, in power-limited situations, it is possible to transmit the PUCCH signal and/or the PUSCH signal preferentially, and drop the SRSs for which no guaranteed power is configured. By this means, the throughput can be improved.

<Control to Take PUSCH into Consideration>

Furthermore, the user terminal may be structured to control the transmission and/or the transmission power of an SRS while the power-limited state is assumed, depending on whether or not the PUSCH is transmitted in subframes in which the SRS is transmitted.

Figure 6A:
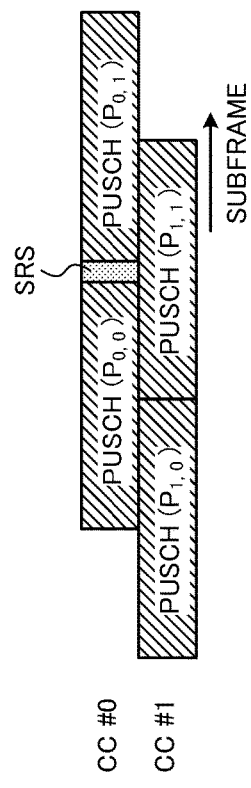
FIG. 6 provide diagrams to explain other examples of SRS power control in dual connectivity.

For example, assume a case where, as shown in FIG. 6A, the power-limited state is created when an SRS is transmitted in a predetermined subframe of the MCG's cell (CC #0), and, in this SRS transmission period, the PUSCH is transmitted in the SCG's cell (CC #1).

Among the symbols (the zeroth to the thirteenth symbol) in a predetermined subframe, the user terminal can multiplex and transmit an SRS over the last symbol (the thirteenth symbol). In this case, the transmission and the transmission power of the SRS is controlled depending on whether or not the PUSCH is allocated in the predetermined subframe in which the SRS is transmitted (for example, in the zeroth to the twelfth symbol).

For example, when the PUSCH is allocated in a predetermined subframe in which the SRS is transmitted (for example, in the zeroth to the twelfth symbol), the user terminal determines the transmission power of the SRS based on the power that is configured for the PUSCH (according to the power control applied to the PUSCH). To be more specific, the user terminal (1) makes the transmission power of the SRS the same as the transmission power of the PUSCH, or (2) applies the same power control (for example, power scaling) as for the PUSCH while maintaining the difference or the ratio between the transmission power of the PUSCH and the transmission power of the SRS.

Figure 6C:
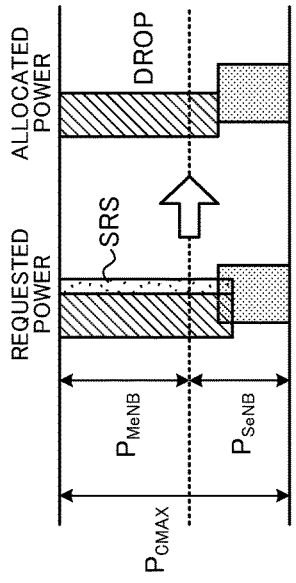
Figure 6B:
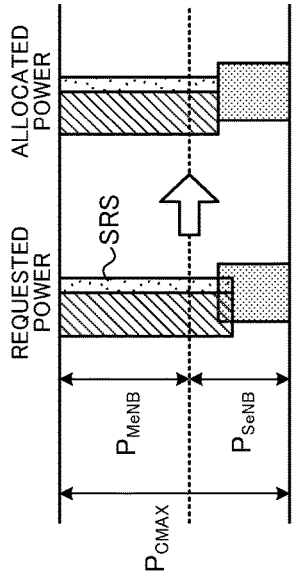

FIG. 6B shows an example of the case where the user terminal (1) makes the transmission power of the SRS the same as the transmission power of the PUSCH. In FIG. 6B, power to exceed the guaranteed power is requested from the master base station MeNB for the transmission of UL signals (for example, the PUSCH) in the MCG's CC #0, and power that is equal to or lower than the guaranteed power is requested from the secondary base station SeNB for the transmission of a UL signal (for example, the PUSCH signal) in the SCG's CC #1. The total sum of the transmission power of all CCs in both cell groups exceeds the maximum possible transmission power $P_{CMAX}$, so that the user terminal applies power scaling or dropping.

The example shown in FIG. 6B illustrates a case where the total sum of the transmission power in the SCG's CC #1 does not exceed the guaranteed power, but the total sum of the transmission power in the MCG's CC #0 exceeds the guaranteed power. In this case, the user terminal allocates the requested power to the SCG as transmission power, and allocates the rest of the power (the extra power that is left after the SCG's transmission power is subtracted from the maximum possible transmission power $P_{CMAX}$) to the MCG.

For the predetermined subframe of CC #0, the user terminal sees the above remaining power as the maximum possible transmission power, and applies power scaling to the PUSCH. Furthermore, the user terminal applies power scaling to the SRS as well, like the PUSCH, without applying dropping. To be more specific, as shown in FIG. 6B, the user terminal configures the same power as that of the PUSCH. By this means, it becomes possible to transmit the SRS, which is dropped according to the rules of existing systems, without dropping. Note that, in existing system, the SRS has to be dropped, as shown in FIG. 6C.

Also, the user terminal may apply power control (for example, power scaling) to an SRS while maintaining the difference or the ratio between the transmission power of the PUSCH and the transmission power of the SRS, instead of applying the same transmission power to the SRS and the PUSCH. For example, the user terminal applies power scaling to the power of the SRS, like the PUSCH, while maintaining the difference or the ratio between the offset that is used to configure the transmission power of the PUSCH ($P_{O\_PUSCH}$) and the offset that is used to configure the transmission power of the SRS ($P_{SRS\_OFFSET}$).

Meanwhile, assume a case here where the PUSCH signal is not transmitted in a predetermined subframe of CC #0, and, furthermore, the power-limited state is created. In this case, the user terminal may transmit the SRS with the extra power that is left after allocating power to the other cell group, not transmit the SRS (dropping), or follow the power control for the PUSCH or the PUCCH.

<Control to Take PUCCH into Consideration>

Also, the user terminal may be structured to control the transmission and transmission power of an SRS when the power-limited state is assumed, depending on whether or not the PUCCH is transmitted in the subframe in which the SRS is transmitted.

For example, assume a case where, as shown in FIG. 6A, the power-limited state is created when an SRS is transmitted in a predetermined subframe of the MCG's cell (CC #0), and, in this SRS transmission period, the PUSCH is transmitted in the SCG's cell (CC #1).

When the PUCCH is allocated in a predetermined subframe of CC #0, the user terminal determines the transmission power of the SRS based on the power that is configured for the PUCCH (according to the power control applied to the PUCCH). To be more specific, the user terminal (1) makes the transmission power density of the SRS the same as the transmission power density of the PUCCH, (2) applies the same power control (for example, power scaling) as for the PUCCH while maintaining the difference or the ratio between the transmission power density of the PUCCH and the transmission power density of the SRS, or (3) applies the power control for the PUSCH to the SRS.

When the user terminal (3) applies the power control for the PUSCH to the SRS, the user terminal executes the power control (for example, power scaling) assuming that the PUSCH is transmitted in the predetermined subframe. That is, the user terminal can apply the power control method of (1) or (2) that has been described earlier in <Control to take PUSCH into consideration>.

On the other hand, assume a case here where the PUCCH signal is not transmitted in a predetermined subframe of CC

0 and, furthermore, the power-limited state is created. In this case, the user terminal may transmit the SRS with the extra power that is left after transmission power is allocated to the other cell group, not transmit the SRS (dropping), or follow the power control for the PUSCH.

Second Example

A case will be described with a second example where, when dual connectivity (DC) is employed, priority is configured in SRSs. Priority can be configured in one or both of periodic SRSs and aperiodic SRSs. Also, varying priorities can be configured for periodic SRSs and aperiodic SRSs.

The priority here can be the priority of transmission over the UL signals (for example, the PUSCH signal, the PUCCH signal, the SRS and so on) of cell groups that are not SRS-transmitting cell groups. On the other hand, this may be the priority of transmission over the UL signals (for example, the PUSCH signal, the PUCCH signal, the PRACH signal, the SRS and so on) of SRS-transmitting cell groups.

<Periodic SRS>

When priority is configured in a periodic SRS, a flag to represent whether the priority is high or low is configured in the periodic SRS. For example, when a periodic SRS is configured in the user terminal by using higher layer signaling, information to represent whether the priority is high or low is reported to the user terminal together.

Also, a plurality of periodic SRSs with varying priorities may be configured in the user terminal. In this case, the information to configure in the user terminal may be structured so that one-bit or multiple-bit flags to represent whether the priorities are high or low are added to the existing periodic SRS configuration (SRS configuration). Also, when a plurality of periodic SRSs are configured (for example, when two SRSs of different transmission cycles are configured), a single or a plurality of virtual cell IDs may be reported to the user terminal to determine the sequence with respect to the second periodic SRS that is configured.

<Aperiodic SRS>

The transmission of aperiodic SRSs from the user terminal is controlled based on downlink control information (for example, DCI format 0, 4 and so on) that is transmitted from the radio base stations. Also, the radio base stations report, in advance, information as to whether or not there is a trigger and/or about the SRS parameter to trigger, to the user terminal, by using higher layer signaling (see FIG. 7A).

So, with the present embodiment, when priority is configured in an aperiodic SRS and the parameters of this aperiodic SRS are configured, whether the priority is high or low can be signaled to the user terminal together.

In particular, when an aperiodic SRS is triggered by using DCI format 4 (UL grant), whether or not there is an SRS trigger and a plurality of SRS parameters if there is a trigger are reported to the user terminal. So, each parameter that is reported to the user terminal can be configured with a different priority (see FIG. 7B). For example, the first SRS parameter set to the third SRS parameter set are configured with mutually varying priorities. By this means, the radio base stations can control SRS transmission flexibly depending on the communication environment.

Alternatively, a structure may be employed here in which information regarding priority is included in downlink control information (UL grant) for controlling aperiodic SRS triggers and reported to the user terminal dynamically.

<Periodic SRS and Aperiodic SRS>

Furthermore, it is possible to configure different priorities between a periodic SRS and an aperiodic SRS. For example, an aperiodic SRS, which is triggered and controlled by the radio base stations, may be configured with a higher priority than a periodic SRS.

Also, different priorities may be configured depending on the classification of destinations to which UL signals are transmitted (including cell groups (CGs), timing advance groups (TAGs) and/or cells). For example, an SRS to be transmitted to the PCell, the PCG, the PTAG and so on may be configured with high priority. In this case, the priority may be configured by using explicit signaling, or may be configured by way of implicitly making a predetermined SRS a priority SRS.

<Transmission Power Configuration According to Priority>

According to the present embodiment, the user terminal may change the transmission power to configure in an SRS based on the priority, instead of controlling whether or not to transmit the SRS according to the priority. For example, the user terminal can preferentially allocate power to an SRS of high priority until reaching the guaranteed power (or $P_{CMAX}$).

Also, when there are a plurality of SRSs with high priority (for example, SRSs of the same priority) and the power-limited state is created, the user terminal can (1) apply power scaling to these multiple SRSs uniformly, or (2) allocate power to part of the SRSs preferentially. "Part of the SRSs" in (2) can be selected from the SRSs that are transmitted in the PCell, the PCG, the PTAG and so on.

Also, when an SRS of low priority is transmitted, or when another UL signal (the PUSCH signal, the PUCCH signal, the PRACH signal, etc.) is prioritized, if power-limited-based power configuration is applied, usually, the SRS of low priority is dropped. However, the present embodiment may apply control so that, if, after power is allocated to the physical channel or signal that is transmitted at the same time with the SRS and there is still remaining power that is available to be allocated, part or all of the remaining power is allocated to the SRS so as to prevent the SRS from being dropped. In this case, guaranteed power is allocated to the physical channel or signal that is transmitted at the same time, so that power for the SRS can be secured.

Third Example

A case will be described with a third example where, when the power-limited state is created at the timing to transmit an SRS, power scaling is applied to the SRS and its transmission is controlled.

In existing systems (for example, Rel. 11), when the power-limited state is created at an SRS transmission timing, the user terminal applies control to drop the SRS. On the other hand, according to the present embodiment, even if the power-limited state is created, the user terminal applies control to avoid dropping the SRS as much as possible, and transmits the SRS by using as much power as possible.

For example, the user terminal applies power scaling so that the total power of the SRS and the UL signals that are transmitted at the same time does not exceed $P_{CMAX}$ (or the guaranteed power). In this case, the user terminal may apply power scaling to the SRS alone, or apply power scaling to part or all of the signals that are transmitted at the same time with the SRS.

Also, when SRSs are transmitted to a plurality of cells at the same timing (for example, in the same subframe), it is possible to correct each SRS's power by multiplying the requested power of each SRS by a predetermined power correction coefficient (w(i)). As for the power correction coefficient, the power correction coefficient (w(i)) that is used in existing systems when the power-limited state is created can be used.

Meanwhile, if the user terminal applies power scaling to the SRSs, it then becomes difficult to measure accurate channel states on the radio base station side. As a result of this, there is a threat that the adaptive modulation/demodulation and channel coding (AMC: Adaptive Modulation and Coding) for the user terminal cannot be configured properly.

So, with the present embodiment, when SRS transmission is configured in a plurality of antennas, dropping or power-scaling is applied to the SRS transmission from part of the antennas. Meanwhile, as for the other antennas, transmission power (requested power) is secured and SRS transmission is carried out. By this means, the radio base stations can measure channel states adequately, and, furthermore, solve the sticking of power (power-limited state) on the user terminal side.

Figure 8:
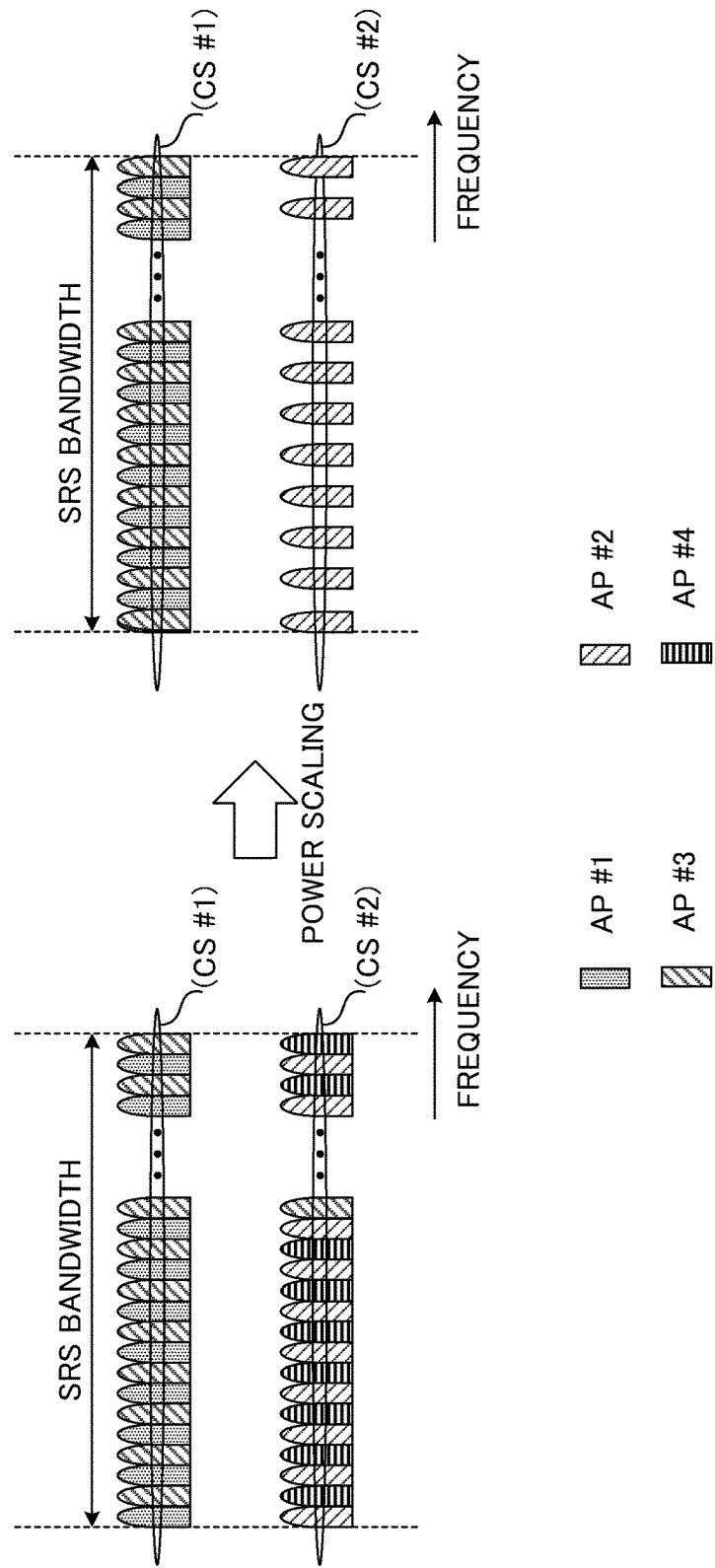
FIG. 8 is a diagram to show an example case of transmitting SRSs from a plurality of antenna ports.

For example, when SRS transmission is configured in a plurality of antenna, the user terminal can lower (power scaling) or drop the transmission power in order from the antenna of the largest antenna port number (see FIG. 8). FIG. 8 shows a case where the user terminal transmits SRSs by using four antenna ports (AP #1 to AP #4).

According to the present embodiment, if the power-limited state is created when SRSs are transmitted from AP #1 to AP #4, power scaling or dropping is applied to the APs, in order, from the AP of the largest AP number (AP #4). FIG. 8 shows a case where AP #4 is dropped (or its transmission power is made 0 by power scaling).

Alternatively, when the user terminal transmits SRSs of different sequences (SRSs of different types), it is possible to apply dropping or power scaling to part of the sequences and secure transmission power for the SRSs of the other sequences. For example, when a periodic SRS and an aperiodic SRS need to be transmitted at the same timing, the user terminal can apply dropping or power scaling to the periodic SRS.

Alternatively, when there is an SRS to be transmitted in a wideband, it is possible to secure the transmission power of the SRS by limiting (narrowing) the transmission band. For example, if the power-limited state is created when the SRS is transmitted, the user terminal limits the transmission band to a predetermined area (for example, 50% of the transmission band) and transmits the SRS.

Alternatively, when SRSs are provided in comb-tooth multiplexing (comb), the user terminal may secure transmission power for the SRSs by lowering the cycle of insertion in frequency. On the radio base station side, whether or not power scaling is applied can be judged by detecting the signals after the IFFT.

Fourth Example

A case will be described with a fourth example where information about the transmission power configuration in the user terminal is reported to the radio base stations.

As mentioned earlier, when dual connectivity (DC) is employed, cases might occur where the power-limited state is created and the user terminal has to apply dropping or power scaling to the transmission of an SRS. In this case, the user terminal reports to the radio base stations that an SRS has been dropped, and/or that power scaling has been applied. Alternatively, the user terminal may be structured to report to the radio base stations that the power-limited state has been created in a predetermined subframe.

As a method of reporting whether or not the power-limited state is created from the user terminal to the radio base stations, it is possible to change the method of transmitting SRSs depending on whether or not the power-limited state is created. For example, the user terminal can report to the radio base stations whether or not the power-limited state is created by changing the signal sequence to apply to SRSs. As for the signal sequences, it is possible to configure two patterns of SRS comb-teeth, and make a choice between these sequences depending on whether or not the power-limited state is created.

Alternatively, even when the power-limited state is not created, the user terminal may nevertheless be structured to report to the radio base stations how much power is left before entering the power-limited state. In particular, when the PUSCH is transmitted, information about the remaining power can be included in the PUSCH and reported. Note that the power head room (PHR) of existing system may be used here.

Also, the user terminal can transmit information about the remaining power to the destination cell (CG) to which SRSs are transmitted, or to other cells (other CGs).

Fifth Example

With a fifth example, the setting of guaranteed power for when part of the cells (or cell groups) employs TDD while dual connectivity (DC) is employed will be described. Note that the fifth example is by no means limited to the guaranteed power of SRSs, and can also be applied to the guaranteed power of other signals (for example, the PUSCH signal and/or the PUCCH signal).

In a mode to configure guaranteed power for every different cell group, as has been shown earlier with the first example, cases might occur where part of the cells (or cell groups) employ TDD. In this case, the UL transmission power that can be configured changes depending on the type of subframes (DL subframes, UL subframes or special (SP) subframes) in other cells (or cell groups) that employ TDD.

For example, assume a case where the MCG configures a cell to employ FDD (for example, CC #0) and an SCG configures a cell to employ TDD (for example, CC #1). In this case, the transmission power which the user terminal can use for UL transmission in CC #0 varies depending the type of subframes in CC #1. For example, when CC #1 uses a DL subframe, uplink transmission power can be configured with ease in CC #0, compared to the case where CC #1 uses a UL subframe.

Consequently, with the present embodiment, a plurality of guaranteed powers are configured for UL signals (for example, the SRS, the PUSCH signal and/or the PUCCH signal. For example, a plurality of guaranteed powers are configured per subframe type, and power allocation is carried out. That is, the user terminal switches between and uses a plurality of guaranteed powers depending on the type of subframes in the counterpart cell.

For example, when two patterns of guaranteed power are used, the guaranteed power for when DL subframes are not transmitted (UL signals are not transmitted) in part of the cells (CC #1), and the guaranteed power for when UL subframes are transmitted (UL signals are transmitted) in part of the cells are configured. The guaranteed power for special subframes can be specified separately between DL subframes and UL subframes, and, for example, can be made the same as that of UL subframes.

The user terminal can identify the type of subframes autonomously from the configuration (UL/DL/SP configuration) in the cell that uses TDD, and switch between and use a plurality of guaranteed powers. Note that information about the UL/DL/SP configuration in the cell using TDD can be learned from the broadcast signal, the (E)PDCCH and so on. Alternatively, a structure may be used here in which information about a plurality of guaranteed powers is reported from the radio base stations to the user terminal.

In this way, when a cell to employ TDD is present while dual connectivity is used, by configuring a plurality of guaranteed powers in association with subframe types (UL/DL/SP configurations), the user terminal can flexibly control the transmission power of UL signals depending on the type of subframes. Note that guaranteed power may be configured in part of the SRS, the PUSCH signal, the PUCCH signal and the PRACH signal, but can be configured in all.

(Structure of Radio Communication System)

Now, the structure of a radio communication system according to an embodiment of the present invention will be described below. In this radio communication system, one of the above-described first example to the fifth example, or a combination of these, can be used.

Figure 9:
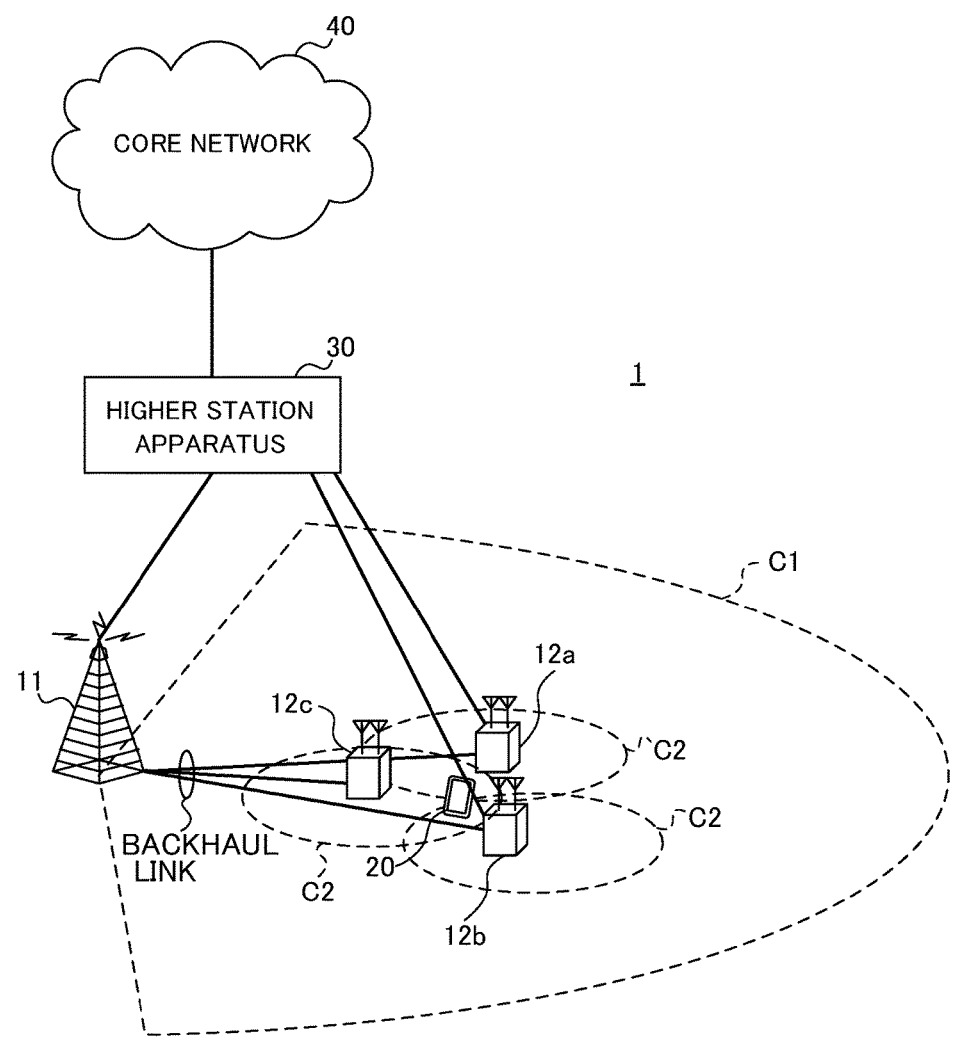
FIG. 9 is a diagram to show an example of a schematic structure of a radio communication system according to the present embodiment.

FIG. 9 is a schematic structure diagram to show an example of the radio communication system according to an embodiment of the present invention. As shown in FIG. 9, a radio communication system 1 is comprised of a plurality of radio base stations 10 (11 and 12), and a plurality of user terminals 20 that are present within cells formed by each radio base station 10 and that are configured to be capable of communicating with each radio base station 10. The radio base stations 10 are each connected with a higher station apparatus 30, and are connected to a core network 40 via the higher station apparatus 30.

In FIG. 9, the radio base station 11 is, for example, a macro base station having a relatively wide coverage, and forms a macro cell C1. The radio base stations 12 are, for example, small base stations having local coverages, and form small cells C2. Note that the number of radio base stations 11 and 12 is not limited to that shown in FIG. 9.

The macro cell C1 and the small cells C2 may use the same frequency band or may use different frequency bands. Also, the radio base stations 11 and 12 are connected with each other via an inter-base station interface (for example, optical fiber, the X2 interface, etc.).

Note that the macro base station 11 may be referred to as a "radio base station," an "eNodeB" (eNB), a "transmission point," and so on. The small base stations 12 may be referred to as "pico base stations," "femto base stations," "home eNodeBs" (HeNBs), "transmission points," "RRHs" (Remote Radio Heads) and so on.

The User terminals 20 are terminals to support various communication schemes such as LTE, LTE-A and so on, and may include both mobile communication terminals and stationary communication terminals. The user terminals 20 can communicate with other user terminals 20 via the radio base stations 10.

The higher station apparatus 30 may be, for example, an access gateway apparatus, a radio network controller (RNC), a mobility management entity (MME) and so on, but is by no means limited to these.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, synchronization signals, MIBs (Master Information Blocks) and so on are communicated by the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is communicated by the PCFICH. HARQ delivery acknowledgement signals (ACKs/NACKs) in response to the PUSCH are communicated by the PHICH. The EPDCCH may be frequency-division-multiplexed with the PDSCH (downlink shared data channel) and used to communicate DCI and so on, like the PDCCH.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgement signals and so on are communicated by the PUCCH. By means of the PRACH, random access preambles (RA preambles) for establishing connections with cells are communicated. Also, a channel quality measurement reference signal (SRS: Sounding Reference Signal) and demodulation reference signals (DM-RSs) for demodulating the PUCCH and the PUSCH are transmitted as uplink reference signals.

Figure 10:
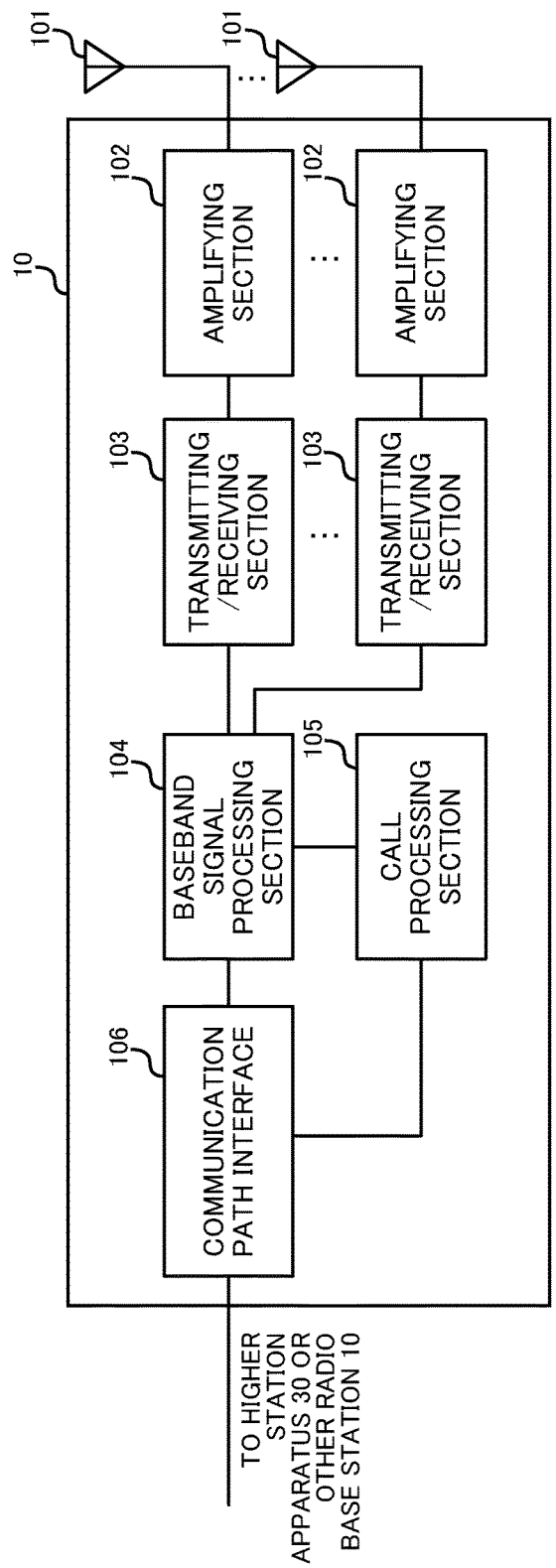
FIG. 10 is a diagram to show an example of an overall structure of a radio base station according to the present embodiment.

FIG. 10 is a diagram to show an overall structure of a radio base station 10 according to the present embodiment. The radio base station 10 (which may be either a radio base station 11 or 12) has a plurality of transmitting/receiving antennas 101 for MIMO communication, amplifying sections 102, transmitting/receiving sections 103, a baseband signal processing section 104, a call processing section 105 and a communication path interface 106. Note that the transmitting/receiving sections 103 are comprised of transmission sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts the downlink signals, pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101. For the transmitting/receiving sections 103, transmitters/receivers, transmitting/receiving circuits or transmitting/receiving devices that are used in the technical field to which the present invention pertains can be used.

Meanwhile, as for uplink signals, radio frequency signals that are received in the transmitting/receiving antennas 101 are each amplified in the amplifying sections 102. Each transmitting/receiving section 103 receives uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base station 10 and manages the radio resources.

The communication path interface section 106 transmits and receives signals to and from the higher station apparatus 30 via a predetermined interface. Also, the communication path interface 106 may transmit and receive signals to and from neighboring radio base stations 10 (backhaul signaling) via an inter-base station interface (for example, optical fiber, the X2 interface, etc.).

Figure 11:
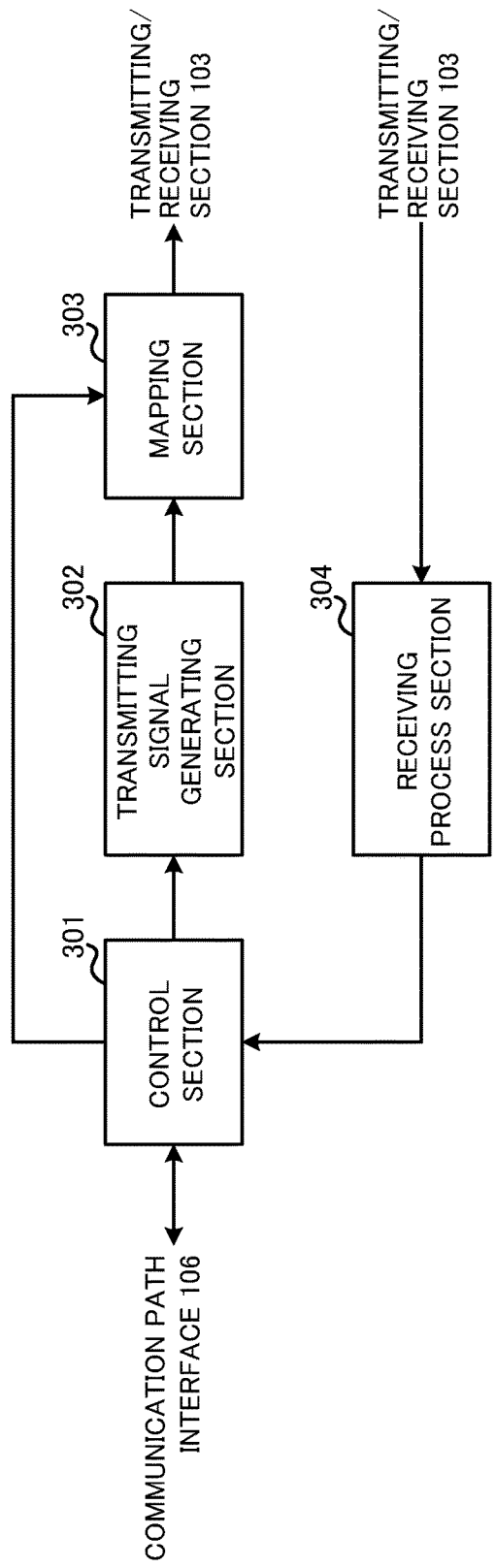
FIG. 11 is a diagram to show an example of a functional structure of a radio base station according to the present embodiment.

FIG. 11 is a diagram to show a principle functional structure of the baseband signal processing section 104 provided in the radio base station 10 according to the present embodiment. Note that, although FIG. 11 primarily shows functional blocks that pertain to characteristic parts of the present embodiment, the radio base station 10 has other functional blocks that are necessary for radio communication as well.

As shown in FIG. 11, the radio base station 10 has a control section (scheduler) 301, a transmission signal generating section 302, a mapping section 303 and a receiving process section 304.

The control section 301 controls the scheduling of downlink data signals that are transmitted in the PDSCH, and downlink control signals that are communicated in the PDCCH and/or the enhanced PDCCH (EPDCCH). Also, the control section (scheduler) 301 controls the scheduling of downlink reference signals such as system information, synchronization signals, the CRS, the CSI-RS and so on. Furthermore, the control section 301 also controls the scheduling of uplink reference signals, uplink data signals that are transmitted in the PUSCH, and uplink control signals that are transmitted in the PUCCH and/or the PUSCH. Note that the control section 301 can be constituted by a controller, a control circuit or a control device that is used in the technical field to which the present invention pertains.

Furthermore, the control section 301 can control the transmission signal generating section 302 and the mapping section 303 in order to adjust the uplink signal transmission power of the user terminals 20 connected with the radio base station 10. To be more specific, the control section 301 estimates channel quality based on SRSs that are transmitted from the user terminals, and controls adaptive modulation/demodulation and channel coding (AMC).

The transmission signal generating section 302 generates DL signals (downlink control signals, downlink data signals, downlink reference signals and so on) based on commands from the control section 301, and outputs these signals to the mapping section 303. For example, the transmission signal generating section 302 generates DL assignments, which report downlink signal allocation information, and UL grants, which report uplink signal allocation information, based on commands from the control section 301. Furthermore, the downlink data signals are subjected to a coding process and a modulation process based on coding rates and modulation schemes that are determined based on CSI from each user terminal 20 and so on.

Also, the transmission signal generating section 302 can generate information about the guaranteed power configured for UL signals such as the SRS, information about priorities, and so on. These pieces of information are reported to the user terminals 20 via the transmitting/receiving sections 103, by using higher layer signaling (for example, RRC signaling, broadcast signals and so on), downlink control signals and so on. Note that the transmission signal generating section 302 can be constituted by a signal generator or a signal generating circuit that is used in the technical field to which the present invention pertains.

The mapping section 303 maps the downlink signals generated in the transmission signal generating section 302 to radio resources based on commands from the control section 301 and outputs these to the transmitting/receiving sections 103. The mapping section 303 can be constituted by a mapping circuit or a mapper that is used in the technical field to which the present invention pertains.

The receiving process section 304 performs receiving processes (for example, demapping, demodulation, decoding and so on) of the UL signals (uplink control signals, uplink data signals, uplink reference signals and so on) transmitted from the user terminal 20. Also, the receiving process section 304 may measure the received power (RSRP), channel states and so on by using the received signals. Note that the processing results and the measurement results may be output to the control section 301. The receiving process section 304 can be constituted by a signal processor or a signal processing circuit that is used in the technical field to which the present invention pertains.

Figure 12:
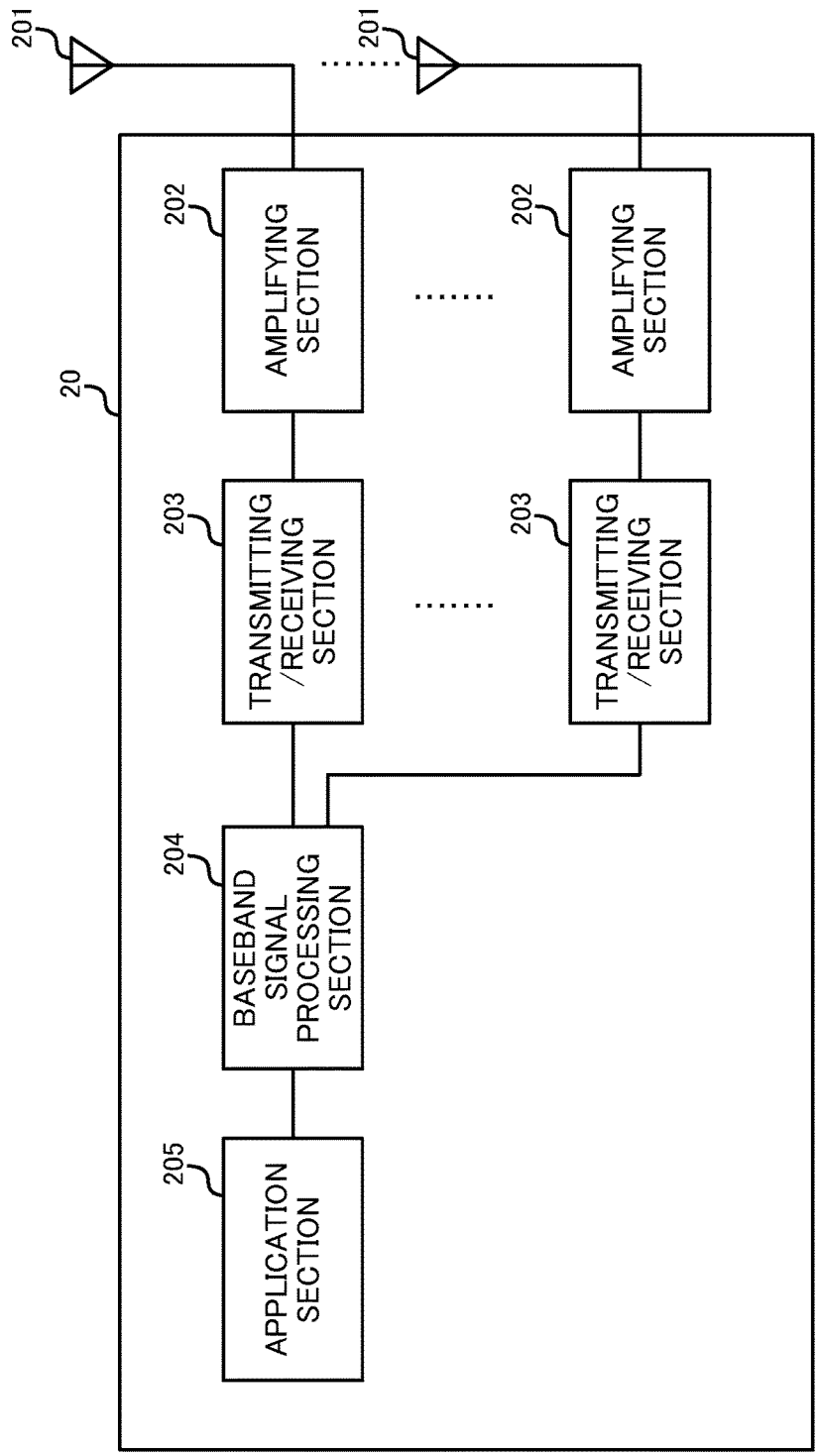
FIG. 12 is a diagram to show an example of an overall structure of a user terminal according to the present embodiment.

FIG. 12 is a diagram to show an overall structure of a user terminal 20 according to the present embodiment. As shown in FIG. 12, the user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmission sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signals are subjected to frequency conversion and converted into the baseband signal in the transmitting/receiving sections 203, and output to the baseband signal processing section 204. The transmitting/receiving sections 203 can be constituted by transmitters/receivers, transmitting/receiving circuits or transmitting/receiving devices that are used in the technical field to which the present invention pertains.

In the baseband signal processing section 204, the baseband signal that is input is subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

The transmitting/receiving sections 203 can transmit and receive signals to and from a plurality of radio base stations that each configure a cell group (CG) comprised of one or more cells. For example, the transmitting/receiving sections 203 are capable of transmitting UL signals to a plurality of CGs at the same time.

Figure 13:
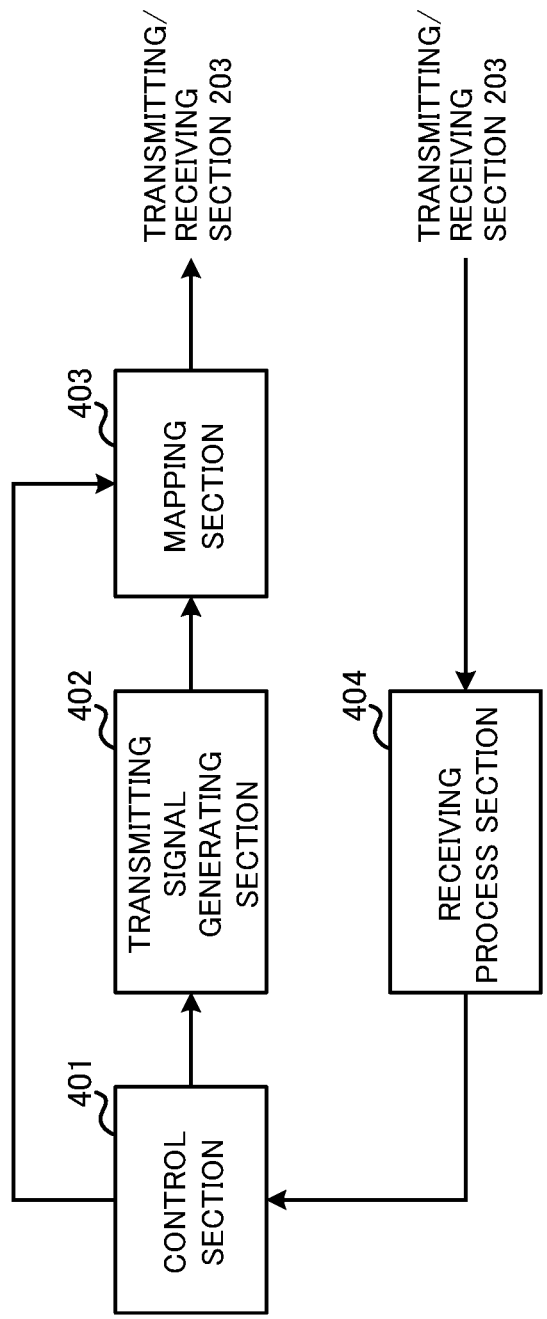
FIG. 13 is a diagram to show an example of a functional structure of a user terminal according to the present embodiment.

FIG. 13 is a diagram to show a principle functional structure of the baseband signal processing section 204 provided in the user terminal 20. Note that, although FIG. 13 primarily shows functional blocks that pertain to characteristic parts of the present embodiment, the user terminal 20 has other functional blocks that are necessary for radio communication as well.

As shown in FIG. 13, the user terminal 20 is comprised at least of a control section 401, a transmission signal generating section 402, a mapping section 403 and a receiving process section 404.

The control section 401 acquires the downlink control signals (signals transmitted in the PDCCH/EPDCCH) and downlink data signals (signals transmitted in the PDSCH) transmitted from the radio base station 10, from the receiving process section 404. The control section 401 controls the generation of UL signals based on the downlink control signals, the results of deciding whether or not retransmission control is necessary for the downlink data signals, and so on. To be more specific, the control section 401 controls the transmission signal generating section 402 and the mapping section 403. Note that the control section 401 can be constituted by a controller, a control circuit or a control device that is used in the technical field to which the present invention pertains.

Also, the control section 401 controls the transmission power of the UL signals (the PUCCH signal, the PUSCH signal, the SRS and so on). To be more specific, when the transmitting/receiving sections 203 transmit UL signals to the MCG and the SCG at the same time, the control section 401 controls the transmission power, taking into consideration the guaranteed power configured for the UL signals (for example, SRSs) (the above first example). Information about the guaranteed power can be acquired from the receiving process section 404. In this case, the guaranteed power for the SRSs may be determined based on the offset value from guaranteed power of the PUCCH and/or the PUSCH.

Also, the control section 401 can control power assuming that the guaranteed power for the SRSs and the guaranteed power for the PUSCH and/or the PUCCH are the same. Also, the control section 401 may control power by applying different guaranteed power depending on the type of SRSs (periodic SRSs or aperiodic SRSs). Also, the control section 401 can control the transmission power of an SRS depending on whether or not the PUCCH and/or the PUSCH are allocated in the subframe in which the SRS is transmitted.

Also, the control section 401 can control transmission by configuring priorities in SRSs (the above second example). Alternatively, when the power-limited state is created at a timing an SRS is transmitted, the control section 401 can control the transmission by applying power scaling to the SRS (the above third example). Alternatively, the control section 401 can apply control so that information about the configuration of transmission power in the user terminal is reported to the radio base station (the above fourth example). Alternatively, when part of the cells (or cell groups) employs TDD, the control section 401 can control the transmission power by using a plurality of guaranteed powers (the above fifth example).

The transmission signal generating section 402 generates UL signals based on commands from the control section 401 and outputs these signals to the mapping section 403. For example, the transmission signal generating section 402 generates uplink control signals such as delivery acknowledgement signals (HARQ-ACKs), channel state information (CSI) and so on, based on commands from the control section 401.

Also, the transmission signal generating section 402 generates uplink data signals based on commands from the control section 401. For example, when a UL grant is contained in a downlink control signal reported from the radio base station 10, the control section 401 commands the transmission signal generating section 402 to generate an uplink data signal. Also, the transmission signal generating section 402 generates SRSs based on commands from the control section 401. Note that transmission signal generating section 402 can be constituted by a signal generator or a signal generating circuit that is used in the technical field to which the present invention pertains.

The mapping section 403 maps the uplink signals generated in the transmission signal generating section 402 to radio resources based on commands from the control section 401, and output the result to the transmitting/receiving section 203. The mapping section 403 can be constituted by a mapping circuit or a mapper that is used in the technical field to which the present invention pertains.

The receiving process section 404 performs the receiving processes (for example, demapping, demodulation, decoding and so on) of the DL signals transmitted from the radio base station 10. Also, the receiving process section 404 may measure the received power (RSRP) and channel states by using the received signals. Note that the processing results and the measurement results may be output to the control section 401. The receiving process section 404 can be constituted by a signal processor or a signal processing circuit that is used in the technical field to which the present invention pertains.

Note that the block diagrams that have been used to describe the above embodiments show blocks in functional units. These functional blocks (components) may be implemented in arbitrary combinations of hardware and software. Also, the means for implementing each functional block is not particularly limited. That is, each functional block may be implemented with one physically-integrated device, or may be implemented by connecting two physically-separate devices via radio or wire and using these multiple devices.

For example, part or all of the functions of radio base stations 10 and user terminals 20 may be implemented using hardware such as ASICs (Application-Specific Integrated Circuits), PLDs (Programmable Logic Devices), FPGAs (Field Programmable Gate Arrays), and so on. Also, the radio base stations 10 and user terminals 20 may be implemented with a computer device that includes a processor (CPU), a communication interface for connecting with networks, a memory and a computer-readable storage medium that holds programs.

Here, the processor and the memory are connected with a bus for communicating information. Also, the computer-readable recording medium is a storage medium such as, for example, a flexible disk, an opto-magnetic disk, a ROM, an EPROM, a CD-ROM, a RAM, a hard disk and so on. Also, the programs may be transmitted from the network through, for example, electric communication channels. Also, the radio base stations 10 and user terminals 20 may include input devices such as input keys and output devices such as displays.

The functional structures of the radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes. Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2014-155153, filed on Jul. 30, 2014, including the specification, drawings and abstract, is incorporated herein by reference in its entirety.

The invention claimed is:

1. A user terminal that performs communications by using dual connectivity configured with a first cell group and a second cell group, the user terminal comprising:
    a transmitter that transmits an uplink (UL) channel and/or a UL signal including a sounding reference signal (SRS) to each cell group;
    a processor that controls transmission power of the UL channel and/or the UL signal for each cell group, and
    a receiver that receives information about guaranteed power that is configured in at least one of the cell groups by higher layer signaling,
    wherein the processor controls the transmission power by using same guaranteed power for transmission power of a physical uplink shared channel (PUSCH) and/or a physical uplink control channel (PUCCH) and transmission power of the SRS, in each cell group.

2. The user terminal according to claim 1, wherein the processor controls the transmission power of the UL signal for the first cell group, taking into consideration the guaranteed power configured in the second cell group and the transmission power of the UL signal including the SRS for the second cell group.

3. The user terminal according to claim 2, wherein, when power that is requested for the UL signal including the SRS for the second cell group is equal to or lower than the guaranteed power configured in the second cell group, the processor configures the requested power for the UL signal including the SRS for the second cell group.

4. The user terminal according to claim 1, wherein, when power that is requested for the UL signal including the SRS for the second cell group is equal to or lower than the guaranteed power configured in the second cell group, the processor configures the requested power for the UL signal including the SRS for the second cell group.

5. A radio base station that communicates with a user terminal using dual connectivity configured with a first cell group and a second cell group, the radio base station comprising:
    a receiver that receives, from the user terminal, an uplink (UL) channel and/or a UL signal including a sounding reference signal (SRS) transmitted from the user terminal; and
    a transmitter that transmits information about guaranteed power that is configured in at least one of the cell groups, to the user terminal by higher layer signaling,
    wherein the receiver receives, as the UL channel and/or the UL signal, a physical uplink shared channel (PUSCH) and/or a physical uplink control channel (PUCCH) and the SRS of which transmission power is controlled by using same guaranteed power.

6. A radio communication method for a user terminal that performs communications by using dual connectivity configured with a first cell group and a second cell group, the radio communication method comprising:
    transmitting a uplink (UL) channel and/or a UL signal including a sounding reference signal (SRS) to each cell group;
    receiving information about guaranteed power that is configured in at least one of the cell groups; and
    controlling transmission power of the UL channel and/or the UL signal for each cell group wherein the user terminal controls the transmission power by using same guaranteed power for transmission power of a physical uplink shared channel (PUSCH) and/or a physical uplink control channel (PUCCH) and transmission power of the SRS, in each cell group.

* * * * *